US009581484B2

(12) United States Patent
Mayer et al.

(10) Patent No.: US 9,581,484 B2
(45) Date of Patent: Feb. 28, 2017

(54) CALIBRATION- AND/OR MONITORING METHOD FOR FMCW RADAR FILL LEVEL MEASURING DEVICES

(75) Inventors: Winfried Mayer, Buch (DE); Manfred Eckert, Todtnau (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 398 days.

(21) Appl. No.: 14/110,476

(22) PCT Filed: Mar. 19, 2012

(86) PCT No.: PCT/EP2012/054742
§ 371 (c)(1),
(2), (4) Date: Oct. 8, 2013

(87) PCT Pub. No.: WO2012/139852
PCT Pub. Date: Oct. 18, 2012

(65) Prior Publication Data
US 2014/0028492 A1     Jan. 30, 2014

(30) Foreign Application Priority Data

Apr. 14, 2011 (DE) .................. 10 2011 007 372

(51) Int. Cl.
*G01F 23/284*     (2006.01)
*G01F 25/00*     (2006.01)

(52) U.S. Cl.
CPC ........ *G01F 23/284* (2013.01); *G01F 25/0061* (2013.01); *G01F 25/0076* (2013.01)

(58) Field of Classification Search
CPC .................. G01F 25/0061; G01F 25/0076
(Continued)

(56) References Cited

U.S. PATENT DOCUMENTS 5,614,911 A * 3/1997 Otto ..................... G01F 23/284
342/124
5,774,091 A    6/1998 McEwan
(Continued)

FOREIGN PATENT DOCUMENTS

| DE | 197 28 653 A1 | 1/1999 |
| DE | 295 22 252 U1 | 4/2001 |
| JP | 2007-333539 A | 12/2007 |

OTHER PUBLICATIONS

English translation of International Preliminary Examination Report in corresponding International Application No. PCT/EP2012/054742, dated Oct. 24, 2013.
(Continued)

*Primary Examiner* — Peter Bythrow
*Assistant Examiner* — Helena Seraydaryan
(74) *Attorney, Agent, or Firm* — Bacon & Thomas, PLLC

(57) ABSTRACT

A method is based on measuring a distance to a reference reflector arranged at a known distance, in order to calibrate and/or monitor a coherent frequency modulation, continuous wave radar, fill-level measuring device, wherein the reference reflector can be reliably identified. To this end, a reference reflector executing oscillations toward the fill-level measuring device with an oscillation frequency is used, which is inserted in the beam path of periodically linearly frequency modulated transmission signals transmitted from the fill-level measuring device. The fill-level measuring device receives fractions of the transmission signals reflected back on reflectors in the container and records based on these received signals and their time correlation relative to the respectively associated transmission signal for each received signal an echo function, which shows the amplitudes of the received signal as a function of the associated position of the associated reflector. Based on the time change of a plurality of sequentially recorded echo
(Continued)

functions and the oscillation frequency of the reference reflector, the position of the reference reflector in the echo functions is identified and its reference reflector position determined.

9 Claims, 2 Drawing Sheets

(58) Field of Classification Search
USPC .......................................................... 342/124
See application file for complete search history.

(56) References Cited

U.S. PATENT DOCUMENTS

| | | | | |
|---|---|---|---|---|
| 5,877,997 | A * | 3/1999 | Fell | G01F 23/2962 367/908 |
| 7,103,500 | B2 * | 9/2006 | Freger | G01S 7/292 702/158 |
| 2002/0109626 | A1 * | 8/2002 | Spanke | G01F 23/284 342/124 |
| 2004/0196177 | A1 * | 10/2004 | Billington | G01S 7/4004 342/174 |
| 2007/0103333 | A1 * | 5/2007 | Michalski | G01F 23/284 340/853.1 |
| 2009/0079618 | A1 * | 3/2009 | Harwood | G01F 23/284 342/174 |
| 2009/0146867 | A1 * | 6/2009 | Delin | G01F 23/284 342/124 |
| 2009/0212997 | A1 * | 8/2009 | Michalski | G01F 23/284 342/137 |
| 2009/0235736 | A1 * | 9/2009 | Spanke | G01F 23/2962 73/290 V |
| 2009/0302867 | A1 * | 12/2009 | Schroth | G01F 23/284 324/642 |
| 2010/0156702 | A1 * | 6/2010 | Edvardsson | G01F 23/284 342/124 |
| 2010/0175470 | A1 | 7/2010 | Schrier et al. | |
| 2011/0231118 | A1 * | 9/2011 | Welle | G01F 23/284 702/55 |
| 2011/0238352 | A1 * | 9/2011 | Griessbaum | G01F 23/2962 702/100 |
| 2012/0056628 | A1 * | 3/2012 | Michalski | G01F 23/284 324/629 |
| 2012/0056774 | A1 * | 3/2012 | Wennerberg | G01F 23/284 342/124 |
| 2012/0265486 | A1 * | 10/2012 | Klofer | G01F 23/0061 702/166 |

OTHER PUBLICATIONS

German Search Report in corresponding German Application No. 10 2011 007 372.8, dated Feb. 13, 2012.
International Search Report in corresponding International Application No. PCT/EP2012/054742, dated Jul. 12, 2012.

* cited by examiner

CALIBRATION- AND/OR MONITORING METHOD FOR FMCW RADAR FILL LEVEL MEASURING DEVICES

TECHNICAL FIELD

The invention relates to a calibration- and/or monitoring method for a coherent frequency modulation, continuous wave radar, fill-level measuring device (FMCW radar, fill-level measuring device).

BACKROUND DISCUSSION

FMCW radar fill level measuring devices are applied for measuring fill levels in a large number of branches of industry, e.g. in the processing industry, in the various fields of chemistry or in the foods industry.

They are usually mounted on a container containing the fill substance and have regularly an antenna pointing at the fill substance, via which they transmit toward the fill substance, with a predetermined repetition frequency, transmission signals modulated by means of a predetermined modulation frequency, and receive their fractions reflected back to the fill-level measuring device. Typically based on the received signals and their time correlation with the respectively associated transmission signals, there is recorded for each received signal an echo function, which presents the amplitudes of portions of the received signals reflected on reflectors in the container, especially on the fill substance, as a function of their frequency difference relative to the instantaneous transmission frequency of the transmission signal present upon their arrival, a signal travel time associated with the frequency difference by way of the time dependence of the modulation or a distance to the respective reflector corresponding to the signal travel time.

Determined from the echo function is a wanted echo, which corresponds to the reflection of the transmission signal on the surface of the fill substance. Due to the time dependence of the modulation, there results from the position of this wanted echo within the echo function directly the associated signal travel time required for the path to surface of the fill substance and back. In the case of known propagation velocity of the microwaves, the signal travel time is directly convertible into the traveled path length, from which there results directly, based on the installed height of the fill-level measuring device over the container, the sought fill level.

There are, however, a large number of events, factors and/or environmental conditions, which can lead to a degrading of the accuracy of measurement of these fill level measuring devices. Examples include changes of the measuring characteristics as a result of accretion on the antenna, temperature effects, such as e.g. a temperature dependence of the propagation velocity or the signal processing in the device, aging effects, damage to the device or extreme environmental conditions such as e.g. dust, particular gases located in the beam path, or high pressure in the container.

In order to be able to detect degrading of the accuracy of measurement and to compensate for such as much as possible, there are already methods used, in the case of which reference reflectors are emplaced at a known distance from the fill-level measuring device above the fill substance, and whose positions are measured with the fill-level measuring device. If the distance to the reference reflector measured by the fill-level measuring device deviates from its actual distance, then a degrading of the accuracy of measurement has been recognized, and such is compensated to the extent possible by a calibration of the fill-level measuring device based on the measured deviation.

A prerequisite for these monitoring- and calibration methods is that the position of the reference reflector can be unequivocally identified by the fill-level measuring device in the echo function, since its distance from the fill-level measuring device can otherwise not be measured. Since the reflection on the reference reflector regularly appears in the echo functions recorded only in the form a relative maximum, the identification of the reference reflector is always problematic or even impossible, when other reflectors are located in the environment of the reference reflector. The other reflectors likewise bring about relative maxima in the echo function, which due to their spatial nearness to the maximum of the reference reflector cannot be distinguished from the maximum of the reference reflector.

Correspondingly, it is frequently not possible to distinguish the relative maximum of the echo function to be attributed to the reflection on the reference reflector from other relative maxima attributable to reflections on other microwave reflecting structures present in the container, such as e.g. installed objects, apparatuses or measuring devices introduced into the container.

SUMMARY OF THE INVENTION

It is an object of the invention to provide a method for calibrating and/or monitoring an FMCW radar, fill-level measuring device with the assistance of reference reflectors, wherein the position of the reference reflector can be reliably identified.

For achieving this object, the invention resides in a method for calibrating and/or monitoring a coherent frequency modulation, continuous wave radar, fill-level measuring device for measuring a fill level of a fill substance in a container, in which method the fill-level measuring device sends toward the fill substance, with a predetermined repetition frequency, transmission signals linearly frequency modulated by means of a predetermined modulation, and receives as received signals their fractions reflected on reflectors located in the beam path of the transmission signals back to the fill-level measuring device, a reference reflector executing oscillations toward the fill-level measuring device with an oscillation frequency amounting to less than half the repetition frequency is inserted above the fill substance at a known distance from the fill-level measuring device in the beam path of the transmission signals, based on the received signals and their time correlation relative to the respectively associated transmission signal for each received signal, an echo function is recorded, which shows the amplitudes of the received signal as a function of its frequency difference relative to an instantaneous transmission frequency of the transmission signal present at its receipt, a signal travel time associated with the frequency difference by way of the time dependence of the modulation or a distance to the respective reflector corresponding to the signal travel time, and based on the time change of a plurality of sequentially recorded echo functions and the oscillation frequency of the reference reflector, a frequency difference, signal travel time or distance to be assigned to this is identified and determined as associated reference reflector position, and the calibrating and/or monitoring of the fill-level measuring device occurs based on the reference reflector position and the known distance of the reference reflector from the fill-level measuring device.

A further development of this invention includes a method of the invention, wherein the oscillations of the reference reflector have an oscillation amplitude, which lies below a distance resolution of the fill-level measuring device, the echo functions reflect complex valued amplitudes of the received signals and sequentially registered echo functions have a fixed phase relationship relative to one another, the maxima of the echo functions are determined and their complex valued amplitudes together with their positions in the respective echo function are retained, for each maximum, based on the complex valued amplitude of a predetermined number of sequential echo functions at the position of the respective maximum, a movement spectrum is derived, which shows the complex valued amplitudes of the echo functions at the respective position as a function of their alteration frequency, that movement spectrum is ascertained, whose real- and/or imaginary part has a maximum at an alteration frequency lying in the region of the oscillation frequency of the reference reflector, and the position in the echo functions associated with this movement spectrum is determined as reference reflector position.

In a further development of the invention, based on the time changes of the amplitudes of a plurality of sequentially recorded echo functions at the reference reflector position, the actual oscillation frequency of the reference reflector is determined.

In an embodiment of the two further developments, the actual oscillation frequency equals that alteration frequency, at which the movement spectrum of the reference reflector has its maximum lying in the region of the oscillation frequency.

In a preferred embodiment, the reference reflector is a mechanically oscillatable structure of a fill level limit switch protruding into the container.

In an additional further development of the last mentioned further development and of the preferred embodiment, the functioning of the reference reflector is monitored based on its oscillation frequency and its actual oscillation frequency determined by the fill-level measuring device.

In an embodiment of the invention a plurality of reference reflectors oscillating toward the fill-level measuring device respectively with oscillation frequencies amounting to less than half the repetition frequency are provided at different distances from the fill-level measuring device, the reference positions of the reference reflectors located over the fill substance are determined, and the calibrating and/or monitoring occurs based on at least one of these reference reflector positions.

In a first embodiment, to this end, the reference reflectors have oscillation frequencies of comparable size, and the ascertained reference reflector positions are associated with the individual reference reflectors based on their different distances from the fill-level measuring device.

In a second embodiment, to this end, the reference reflectors have oscillation frequencies of different size, and the ascertained reference reflector positions are associated with the individual reference reflectors based on their different oscillation frequencies and/or their different distances from the fill-level measuring device.

In an embodiment of the first mentioned further development, width and amplitude of the maxima lying in the region of the oscillation frequency are determined and monitored for movement spectra of the reference reflector derived at different times.

BRIEF DESCRIPTION OF THE DRAWINGS

The invention and its advantages will now be explained in greater detail based on the figures of the drawing, in which an example of an embodiment, is presented; equal parts are provide in the figures with equal reference characters. The figures of the drawing show as follows.

DETAILED DISCUSSION IN CONJUNCTION WITH THE DRAWINGS

In the case of which the fill-level measuring device sends toward the fill substance, with a predetermined repetition frequency, transmission signals frequency modulated by means of a predetermined linear modulation, and receives as received signal their fractions reflected on reflectors located in the beam path of the transmission signals back to the fill-level measuring device, a reference reflector is inserted above the fill substance at a known distance from the fill-level measuring device in the beam path of the transmission signals, based on the received signals and their time correlation relative to the respectively associated transmission signal for each received signal, an echo function is recorded, which shows the amplitudes of the received signal as a function of its frequency difference relative to an instantaneous transmission frequency of the transmission signal present at its receipt, a signal travel time associated with the frequency difference by way of the time dependence of the modulation or a distance to the respective reflector corresponding to the signal travel time, and, based on the echo functions, for the reference reflector, an associated frequency difference, signal travel time or distance is identified and determined as associated reference reflector position, and the calibration and/or monitoring of the fill-level measuring device occurs based on the reference reflector position and the known distance of the reference reflector from the fill-level measuring device.

Figure 1:
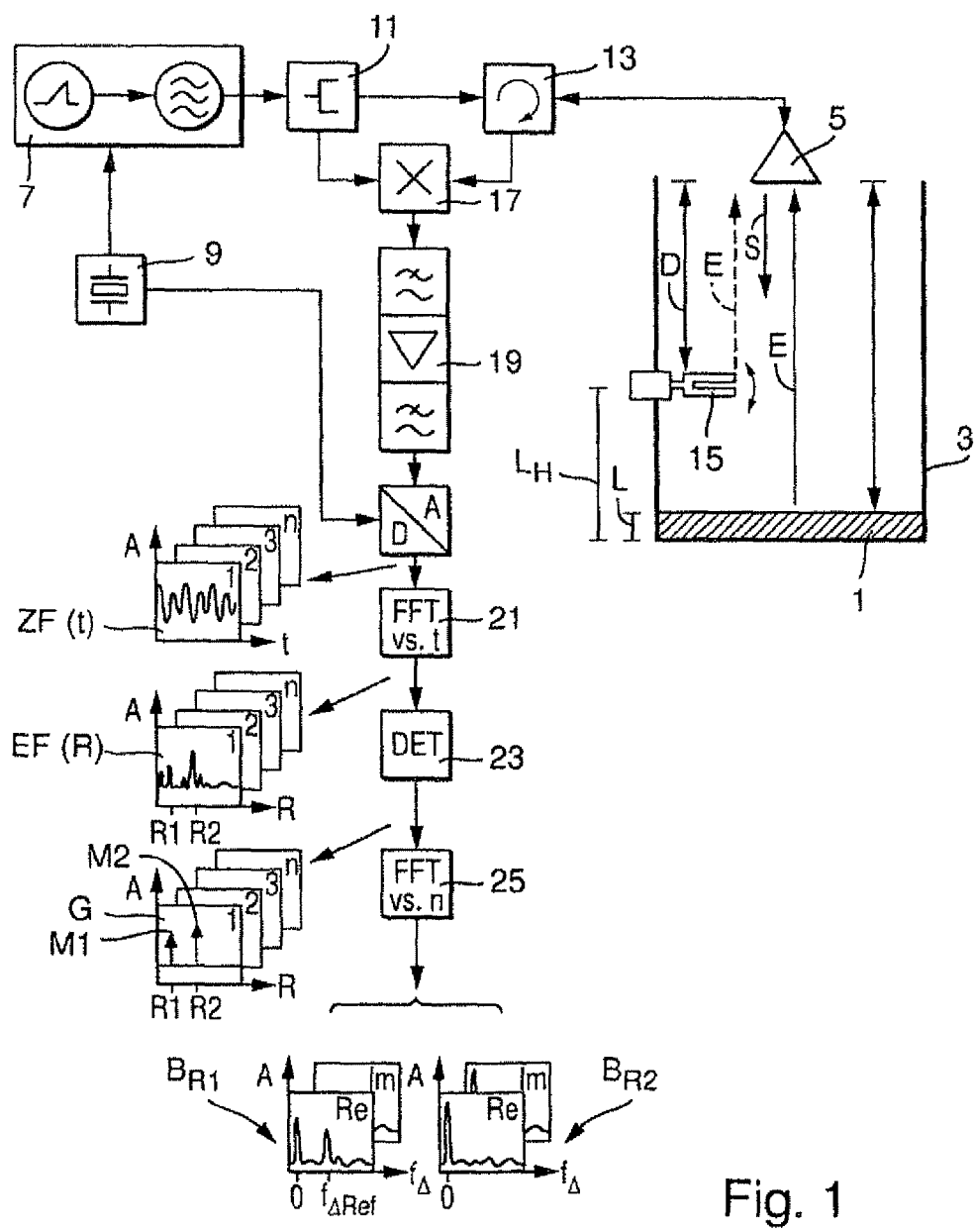
FIG. 1 is a block diagram of an FMCW radar, fill-level measuring device in combination with a fill level measuring arrangement equipped with a reference reflector.

FIG. 1 shows a block diagram of a coherent frequency modulation, continuous wave radar, fill-level measuring device (FMCW radar, fill-level measuring device) in combination with a fill level measuring arrangement.

The measuring arrangement includes a container 3 containing a fill substance 1. The fill-level measuring device serves in measurement operation to measure a fill level L of the fill substance 1 in the container 3, and is, to this end, mounted on the container 3 above the fill substance 1.

The fill-level measuring device includes, pointing at the fill substance 1, an antenna 5, via which the fill-level measuring device sends sequentially toward the fill substance 1, with a predetermined repetition frequency $f_R$, transmission signals S of a predetermined transmission signal duration and frequency modulated by means of a predetermined linear modulation.

The producing of the transmission signals S occurs, such as in the case for conventional FMCW radar, fill-level measuring devices, also here by means of a corresponding microwave generator 7. Suited for this is, for example, a ramp generator, which impresses on a local oscillator signal derived from a reference oscillator 9 the predetermined linear modulation. In the case of coherent FMCW radar, fill-level measuring devices, there is a fixed phase relationship between sequentially following transmission signals S. For assuring the stability of the coherence, it is common practice to apply an oscillator of high quality, e.g. a quartz oscillator, as reference oscillator 9.

The linear modulation is in the illustrated example given by a sawtooth function, according to which the frequency $f_S(t)$ of the transmission signal S rises within the predetermined transmission signal duration $T_S$ continuously by a predetermined frequency increment $\Delta f_r$.

The linearly frequency modulated transmission signals S are fed via a divider network 11 and a transmitting- and receiving separator 13 to the antenna 5, and sent from there into the container 3.

The transmission signals S are reflected in the container 3 on reflectors located in their beam path. Correspondingly, there is received via the antenna 5 a received signal E, which corresponds to a superpositioning of the individual portions of the transmission signal S reflected on the reflectors located in the beam path back to the antenna 5. Among the reflectors are besides the surface of the fill substance, also components installed in a container, measuring devices, stirring mechanisms, or other microwave reflecting elements located in the container 3 or protruding into the container 3.

Moreover, inserted in the beam path of the transmission signals S above the fill substance 1 at a known distance D from the fill-level measuring device is a reference reflector 15.

According to the invention, the reference reflector 15 executes mechanical oscillations directed toward the fill-level measuring device with an oscillation frequency $f_{OS}$ amounting to less than half the repetition frequency $f_R$, with which the sequential transmission signals S are sent.

Suited as reference reflectors 15 are basically all microwave reflecting, mechanically oscillatable structures protruding into the beam path for executing oscillations with an, in comparison to the duration of a plurality of sequential measuring cycles of the fill-level measuring device, approximately constant, at least approximately known, oscillation frequency $f_{OS}$, which amounts to less than half the repetition frequency $f_R$ of the transmission signals S.

Preferably applied for this are mechanically oscillatable structures having a reflectivity, which is as high as possible. In such case, the oscillatable structures can be embodied, for example, as edge- or corner reflectors.

In a preferred form of embodiment of the invention, the reference reflector 15 is a fill level limit switch having a mechanically oscillatable structure protruding into the container 3. Fill level limit switches serve for establishing and/or monitoring an exceeding or subceeding of a fill level $L_H$ predetermined by their installed height in the container 3. They are sold, for example, by the group of companies, Endress + Hauser, under the marks LIQUIPHANT and SOLIPHANT and are, in any event, present in the container 3, especially as overfilling preventers, in a plurality of applications of FMCW radar, fill-level measuring devices.

In the case of the most well-known apparatuses of this type, the mechanically oscillatable structure includes, coupled via a membrane, two oscillatory fork tines, which are caused to oscillate perpendicular to their longitudinal axes with mutually opposing phase via an electromechanical transducer mounted on the rear-side of the membrane facing away from the tines. Additionally, also apparatuses are known, whose oscillatable structure has only one oscillatory rod. In operation, the oscillatory structures are excited to execute resonant oscillations, whose frequency depends decisively on whether the structure is oscillating freely, or, instead, covered by the fill substance 1. Freely oscillating, oscillatory structures of fill level limit switches have, depending on form of construction and fill substance, an oscillation frequency $f_{OS}$ in the range of 100 Hz to a maximum of 2000 Hz and an oscillation amplitude in the order of magnitude of 100 µm. Thus, typical values of the oscillation frequency $f_{OS}$ in the case of oscillatory forks for the use in bulk goods lie e.g. In the range of 100 Hz or 350 Hz, while typical values in the case of oscillatory forks for the use in liquids lie e.g. In the range of 300 Hz to 400 Hz or 900 Hz to 1200 Hz.

As also in the case of conventional FMCW radar, fill-level measuring devices, based on the received signals E and their time correlation relative to the respectively associated transmission signal S, there is plotted for each received signal E an echo function EF, which shows the amplitudes A of the received signal E as a function of its frequency difference $\Delta f$ relative to the instantaneous transmission frequency $f_S(t)$ of the transmission signal S present at its arrival, a signal travel time $t_L$ associated with the frequency difference $\Delta f$ by way of the time dependence of the modulation or a distance, or range, R to the respective reflector corresponding to the signal travel time $t_L$ in the case of known propagation velocity of the microwave signals. All three variants are equivalent. Correspondingly, a certain frequency difference $\Delta f$, signal travel time $t_L$ or distance R is subsequently also referred to herein as the position within the echo function EF.

The echo functions EF are derived, for example, by feeding the received signals E via the transmitting- and receiving separator 13 to a mixer 17, in which they are superimposed on the instantaneous transmission signal S likewise supplied to the mixer 17, in this case via the divider network 11.

At the time(t) of frequencies $f_E(t)$ of the individual fractions of the received signals E have a frequency difference $\Delta f$ related to the instantaneous transmission frequency $f_S(t)$ of the transmission signal S, which depends on the time dependence of the applied modulation, and which depends on the travel time $t_L$ required for propagation to the respective reflector and back.

For obtaining this information contained in the output signal of the mixer 17, the output signal is filtered in a signal conditioning system 19 via a low-pass filter and preferably also amplified. The low-pass filter filters out from the output signal of the mixer 17 its low frequency, and therewith the information concerning the part containing the frequency differences $\Delta f$, and leads the filtered and reinforced signal to an analog-digital converter A/D, which executes a sampling and digitizing of the filtered signal. For ensuring the coherence of the fill-level measuring device, a sampling is required here, which assures a unique, preferably linear, and, over time, stable associating of the individual sampling points in time t with the instantaneous transmission frequency $f_S(t)$ of the transmission signal S generated via the microwave generator 7. This happens preferably, by predetermining the sampling points in time based on the local oscillator signal of the reference oscillator 9.

Based on the output signal of the analog-digital converter A/D, for each of the sequentially received, received signals $E_1, \ldots, E_n$, an intermediate frequency signal IF(t) is stored, which shows the amplitude A of the associated low frequency part of the output signal of the mixer 17 as a function of time t. In such case, there exists in the case of coherent FMCW radar, fill-level measuring devices a fixed phase relationship between the intermediate frequency signals IF(t) of sequentially received signals $E_1, \ldots, E_n$.

Then, by means of a Fourier transformer 21, a Fourier-transformation of the intermediate frequency signals IT(t) of the received signals $E_1, \ldots, E_n$ is performed, which yields the complex valued amplitudes of the intermediate frequency signals IF(t) as a function of the frequency difference $\Delta f$.

At the output of the Fourier transformer 21 therewith, echo functions $EF(\Delta f)$ are available, which reflect the complex valued amplitudes A of the received signals $E_1, \ldots, E_n$ as a function of their frequency differences $\Delta f$ relative to the instantaneous transmitting frequencies $f_S(t)$ of the transmission signals S.

Alternatively to this, the frequency differences $\Delta f$ can be converted into the associated signal travel time $t_L$ based on the known time dependence of the modulation and the echo functions EF determined as the echo functions $EF(t_L)$ reflecting the complex valued amplitudes A of the received signals $E_1, \ldots, E_n$ as a function of their signal travel time $t_L$ and stored for their further evaluation and processing Preferably, the Fourier transformed, intermediate frequency signals of the received signals $E_1, \ldots, E_n$, however, such as presented here, are converted via the relationship between the frequency difference $\Delta f$ and distance (range) R of the fill-level measuring device, respectively its antenna 5, to the respective reflector given by the time dependence of the modulation and the propagation velocity of the microwave signals, and determined as echo functions EF(R) reflecting the complex valued amplitudes A of the received signals $E_1, \ldots, E_n$ as a function of the distance R to the associated reflector and stored for their further evaluation and processing.

Based on the echo functions EF(R), now the fill level L to be measured can be determined. In such case, via corresponding algorithms, that maximum of the respective echo function EF(R) is determined, which can be attributed to a reflection of the respective transmission signal S on the surface of the fill substance. As a rule, this is the absolute maximum of the respective echo function EF(R). The position of the fill level L in the echo function EF(R) is, thus, as a rule, identifiable directly based on the amplitude spectrum of the respective echo function EF(R). For this, usable methods are known from the state of the art and, consequently, not described here in detail.

In contrast, an unequivocal identification of the position of the reference reflector 15 in the echo functions EF(R) is, as a rule, not directly possible based on the echo functions EF(R), especially in the presence of other reflectors in the environment of the reference reflector 15. The reason for this is that the reference reflector 15 is present in the echo function EF(R), as a rule, only as a relative maximum, that cannot always be distinguished from other relative maxima contained in the same echo function EF(R) without there being some doubt as to the correctness of the identification. If another reflector with a reflectivity comparable to the reflectivity of the reference reflector 15 is located in the vicinity of the reference reflector 15, then the reference reflector 15 can neither be unequivocally identified based on the associated amplitude of the echo function EF(R) nor based on the associated distance R.

This problem is solved according to the invention by the fact that the reference reflector 15 oscillates, and its oscillation frequency $f_{OS}$ is less than half the repetition frequency $f_R$, with which sequential transmission signals S are transmitted.

The reference reflector 15 of the invention is, thus, a target moved with an oscillation frequency $f_{OS}$, whose movements show up in the time behavior of the echo functions $EF_1(R), \ldots, EF_n(R)$ of the sequentially received signals $E_1, \ldots, E_n$.

According to the invention, accordingly, based on the time change of a plurality of sequentially recorded echo functions $EF_1(R), EF_n(R)$, which, due to the coherence, have a fixed phase relationship with respect to one another and based on the oscillation frequency $f_{OS}$ of the reference reflector 15, the distance R to be assigned to this is identified and determined as associated reference reflector position $R_{ref}$.

In the case of reference reflectors 15, whose mechanical oscillation amplitude is greater than the distance resolution of the FMCW radar, fill-level measuring device, it would be necessary for this to apply complex methods taking into consideration Doppler-effects for detecting moved targets, such as is used, for example, in military technology.

These complicated methods can be avoided by applying reference reflectors 15, such as e.g. the above mentioned fill level limit switch, whose oscillations effect distance changes relative to the fill-level measuring device, which lie below the distance resolution $\Delta x$ of the fill-level measuring device. The latter corresponds about to the quotient of the speed of light $c_0$ and twice frequency increment $\Delta f_I$, $$\Delta x = \frac{c_0}{2\Delta f_I}$$

and lies in the case of FMCW-radar, fill-level measuring devices with transmitting frequencies $f_S$ above 50 GHz in the centimeter range. It lies therewith clearly above the mechanical oscillation amplitude of fill level limit switches.

If one subdivides the distances in the echo functions EF(R) into individual range gates each having a width predetermined by the distance resolution $\Delta x$ of the fill-level measuring device, in which widths the complex amplitude of the echo function EF(R), in each case, is given by a sampling point, then the maximum of the respective echo function EF(R) attributable to the reflection on the reference reflector 15 lies in received signals $E_1, \ldots, E_n$ sequentially entering the echo functions EF(R) always in the same range gate.

Figure 2:
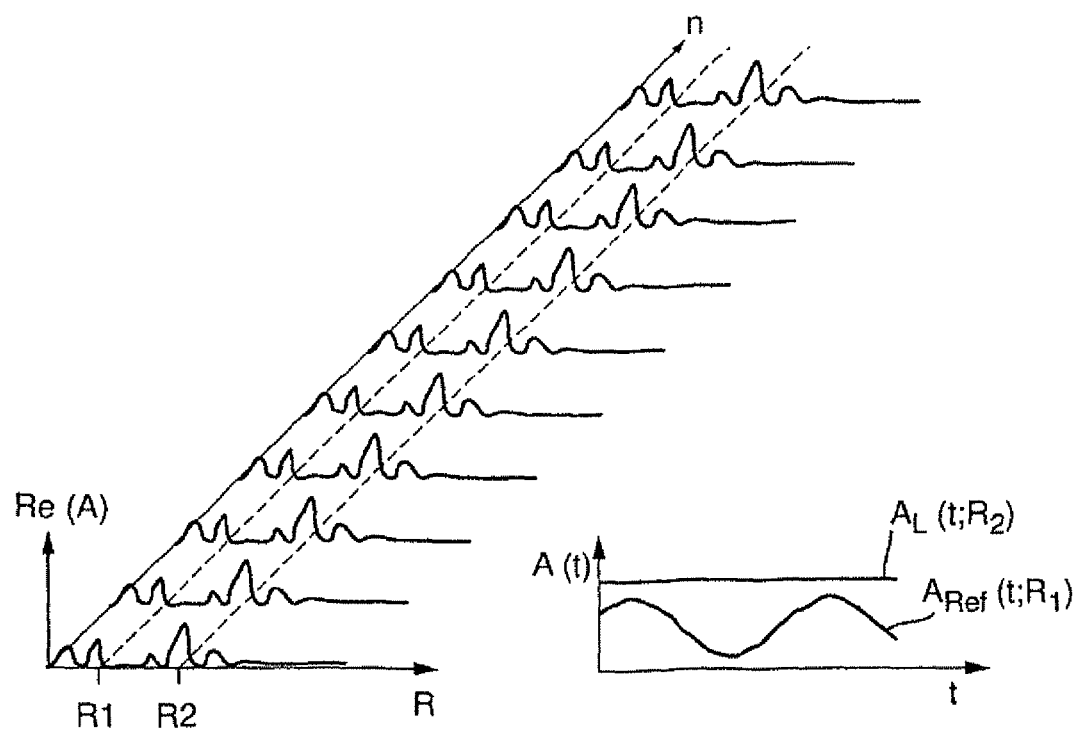
FIG. 2 is a time plot of a plurality of sequentially recorded echo functions, as well as the therefrom apparent time dependence of the amplitudes of the echo functions at the position of the reference reflector and at the position of the fill level.

FIG. 2 shows, in this connection, an example of the time behavior of the real part of the amplitudes re(A(R)) of a plurality of sequentially recorded echo functions EF(R). To the right alongside is presented the therefrom apparent, time oscillation of the amplitude $A_{Ref}(t; R1)$ of the echo functions EF(R) at the position R1 in the echo functions EF(R) corresponding to the distance D of the reference reflector 15 as a function of the time t. In the comparison thereto, there is presented in the same diagram the constant amplitude $A_L(t; R2)$ of the absolute maxima attributable to the reflection on the surface of the fill substance at the position R2 of the echo functions EF(R).

Figure 3:
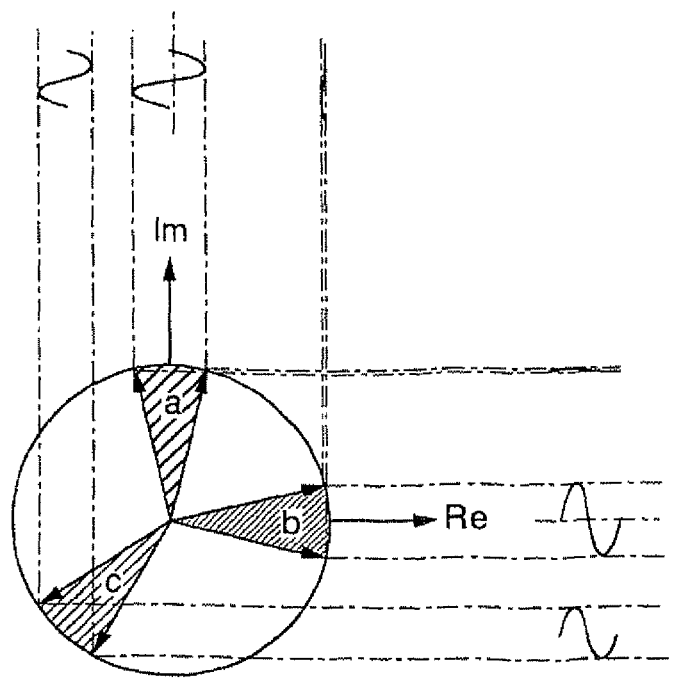
FIG. 3 is a phasor representation of a modulation circuit in the complex plane.

The small (in comparison to the wavelength of the microwave signals) oscillation-related distance changes of the reference reflector 15 relative to the fill-level measuring device bring about a phase modulation of the complex amplitude A(t, R1) arising at the position R1 of the reference reflector 15 in the echo functions EF(R). This relationship is illustrated in FIG. 3 in a phasor representation of a modulation circle in the complex plane. Depending on the absolute phase relationship of the amplitude A(t, R1), predetermined by the separation of the reference reflector 15 from the fill-level measuring device, the phase modulation brought about by the mechanical oscillations of the reference oscillator 15 effects a time change of the imaginary part (a in FIG. 3), the real part (b in FIG. 3), and a time change of the combined real- and imaginary parts (c in FIG. 3). Since the microwave signals travel the path to the reference reflector 15 and back, one revolution on the modulation circle corresponds here to a half wavelength of the microwave signal. Correspondingly, for identification of the reference reflector 15 based on this phase modulation, both real- as well as also imaginary parts of the complex amplitudes are taken into consideration.

In such case, the following holds for the modulation shift $\Delta\phi$ of this phase modulation:

$$\Delta\varphi = \frac{2 f_S a}{\pi c_0}$$

wherein $f_S$ is the center microwave frequency of the transmission signals S, a is the oscillation amplitude of the reference reflector 15, and $c_0$ is the speed of light.

In the case of a center microwave frequency of the transmission signals S of 79 GHz and an oscillation amplitude of the reference reflector 15 of 100 μm, a modulation shift of 3° results.

For identifying and determining the reference reflector position $R_{ref}$ in a signal processing system 23 by means of corresponding software DET, the maxima $M_i$ of the echo functions EF(R) of a predetermined number n of sequential, received signals $E_1, \ldots, E_n$ are determined and their complex valued amplitudes $A_i$ together with their positions, here the distance, or range, $R_i$, within the echo function EF captured in a reflector list.

Each maximum $M_i(R_i)$ of one of the echo functions EF(R) of the sequential, received signals $E_1, \ldots, E_n$ corresponds to a reflection of a part of the associated transmission signal S on a reflector located at the respective distance $R_i$ from the fill-level measuring device. For purposes of perspicuity, graph G shows only the absolute magnitudes of the amplitudes A of the maximum M1 attributable to the reflection on the reference reflector 15 and the maximum M2 attributable to the reflection on the surface of the fill substance.

Then, for each of the distances $R_i$, at which in the echo function EF(R) of the first received signal $E_1$ of the series a maximum $M_i$ was detected, based on the time behavior of the amplitudes A(t, $R_i$) arising at the corresponding distance $R_i$ in the echo functions EF(R) of the n sequential, received signals $E_1, \ldots, E_n$, that distance $R_{ref}$ is ascertained, at which the real- and/or imaginary parts of the amplitude A(t, $R_i$) changes with an alteration frequency $f_{\Delta Ref}$ lying in the region of the oscillation frequency $f_{OS}$ of the reference reflector 15.

For this, preferably by means of an additional Fourier transformer 25, for each of the distances a Fourier transformation over the complex amplitudes A(t; $R_i$) of the echo functions EF(R) of the n sequential, received signals $E_1, \ldots, E_n$ is performed.

From this there results, corresponding to the number of detected maxima $M_i$, a number of movement spectra $B_{Ri}$, which show, respectively, real- and imaginary parts of the amplitudes $A_{Ri}$ measured at the associated distance $R_i$ as a function of their alteration frequencies $f_\Delta$. In the movement spectra $B_{Ri}$, static reflectors appear as a maximum at an alteration frequency $f_\Delta$ of zero. Correspondingly, the movement spectrum $B_{R2}$ derived for the distance R2 to be assigned to the surface of the fill substance shows only one marked maximum at an alteration frequency $f_\Delta$ of zero.

In contrast, movement spectra $B_{Ri}$ of moved reflectors have also at alteration frequencies $f_\Delta$ different from zero, depending on type and time dependence of the movement, an amplitude different from zero. Correspondingly, the movement spectrum $B_{R1}$ of the reference reflector 15 has in the real- and/or imaginary parts a marked maximum at an alteration frequency $f_{\Delta Ref}$ lying in the region of the oscillation frequency $f_{OS}$ of the reference reflector 15.

Correspondingly, the reference reflector 15 is identified by ascertaining that movement spectrum $B_i$, which has in the real- and/or imaginary parts a marked maximum in the region of the oscillation frequency $f_{OS}$ of the reference reflector 15. Based on the distance $R_1$ associated with this movement spectrum $B_{R1}$, there results directly therefrom the sought reference reflector position $R_{ref}$.

In such case, the identification probability and the accuracy of the determining of the reference position $R_{ref}$ of the reference reflector 15 rises in the case of sufficiently high oscillation quality factor of the reference reflector 15, such as regularly exists in the case of fill level limit switches, with increasing number n of the included sequential, received signals $E_1, \ldots, E_n$.

Besides the movement spectrum $B_{R1}$ of the reference reflector 15, also movement spectra of other—per se static— reflectors can have, due to shaking or unwanted vibrations at the location of use, measurable amplitudes at alteration frequencies $f_\Delta$ different from zero. The movement spectra can, however, be distinguished regularly based on the oscillation frequency $f_{OS}$ of the movement spectrum $B_{R2}$ of the reference reflector 15 characteristic for the reference reflector 15.

In fill-level measuring devices in which the echo functions EF are plotted not as a function of the distance R, but, instead, as a function of the frequency difference Δf or the signal travel time $t_L$, the method can, of course, be performed completely analogously, wherein in such case, correspondingly the frequency difference $\Delta f_{ref}$ or the signal travel time $t_{Lref}$ to be assigned to this is determined as associated reference reflector position.

Based on the reference reflector position $R_{ref}$ measured with the fill-level measuring device and based on its pre-known distance D from the fill-level measuring device, now, an, in given cases, existing deviation between measured reference reflector position $R_{ref}$ and actual reference reflector position can be determined and applied for performance of calibration- and/or monitoring methods.

In such case, all known calibration- and/or monitoring methods based on reference measurements with static reference reflectors can, completely analogously, be applied and used.

Instead of a single reference reflector 15 in the container 3, also two or more reference reflectors 15 of the invention can be provided, in each case, arranged at different known distances D from the fill-level measuring device. With the method of the invention, here correspondingly, all reference reflectors 15 located above the fill substance 1 are unequivocally identifiable based on their respective oscillation frequencies $f_{OS}$, with which they oscillate toward the fill-level measuring device. In such case, first of all, all reference reflector positions $R_{ref}$ are determined with the above described method, and then matched with the respective reference reflectors 15.

If a plurality of reference reflectors 15 are applied with oscillation frequencies $f_{OS}$ of identical or comparable size, then the matching of the ascertained reference reflector positions $R_{ref}$ with the individual reference reflectors 15 occurs based on their known, different distances D from the fill-level measuring device. If, for this, reference reflectors 15 are applied, which have oscillation frequencies $f_{OS}$ of different size, then the matching can occur based both on their different oscillation frequencies $f_{OS}$ as well as also based on their different known distances D from the fill-level measuring device.

The calibrating and/or monitoring occurs here selectively based on the in the above described manner determined reference reflector positions of a certain selected plurality or all reference reflectors 15 located above the fill substance 1. In such case, based on the positions of a plurality of reference reflectors 15 located above the fill substance 1, e.g. by interpolation, a calibration dependent on measured distance can be performed.

Besides the calibrating and/or monitoring of the fill-level measuring device, preferably the functioning of the reference reflectors 15 located above the fill substance 1 is also monitored.

When a reference reflector 15 is missing or, e.g. due to a defect, no longer performs periodic oscillations with frequencies in the region of the oscillation frequency $f_{OS}$, its reference reflector position cannot be determined with the above described method. If this is the case, this is automatically recognized by the fill-level measuring device and preferably a corresponding error report is output and/or an alarm is triggered.

In connection with fill level limit switches installed as reference reflectors 15, there is provided therewith simultaneously a monitoring of the functional ability of the fill level limit switch.

Conversely, based on the movement spectra $B_{R1}$ of the reference reflector 15 functioning without problem, a self monitoring of the fill-level measuring device is performable. For this, preferably width and amplitude of the maxima lying in the region of the oscillation frequency $f_{OS}$ in movement spectra $B_{R1}$ derived at different times are determined and monitored. A suddenly occurring or longer term broadening of the maxima and/or a sinking of their amplitudes are/is an unequivocal indication of a change in the measuring characteristics of the fill-level measuring device. Cause for this can be, for example, a change of the dynamic range of the signal recording and/or signal processing or an error arising in the production of the transmission signals S.

Moreover, based on time changes of the amplitudes A(t, $R_{ref}$) of a plurality of sequentially recorded echo functions EF(R) at the reference reflector position $R_{ref}$ of the respective reference reflector 15, it is possible to determine the actual oscillation frequency of the respective reference reflector 15. This corresponds to the alteration frequency $f_{\Delta Ref}$ of the maximum of the movement spectrum $B_{R1}$ of the respective reference reflector 15 lying in the region of the oscillation frequency $f_{OS}$.

The actual oscillation frequency enables a qualified monitoring of the functioning of the respective reference reflector 15. In such case, changes and/or deviations of the actual oscillation frequency $f_{\Delta Ref}$ from the oscillation frequency $f_{OS}$ of this reference reflector 15 stored in the fill-level measuring device can be automatically recognized and even quantitatively determined by the fill-level measuring device. In such case, progressively smaller changes or deviations can be determined, as the associated measurement time interval, respectively the number n of included sequential, received signals $E_1, \ldots, E_n$ becomes larger, over which the actual oscillation frequencies are determined.

In this way, e.g. accretions on the reference reflector 15, which bring about a measurable reduction of its oscillation frequency, can be recognized early and displayed. Accretion formation arises from deposits on the reference reflector 15. They can be caused, for example, by fill substance splashes, which cling to, respectively dry on, the reference reflector 15. In the case of reference reflectors 15, which are not always located above the fill substance 1, it can naturally also arise as a result of direct fill substance contact.

The early detecting of accretions on the reference reflector 15 is especially advantageous, when accretion effects a reduction of the reflectivity of the reference reflector 15, which would make its identification unnecessarily difficult.

In connection with fill level limit switches as reference reflectors 15, based on the actual oscillation frequency, moreover, their functional ability can be monitored by recognizing and/or measuring deviations of the actual oscillation frequency $f_{\Delta Ref}$ of the limit switch from the oscillation frequency $f_{OS}$ predetermined for such, In the case of fill substances 1, which have a low dielectric constant, at least a small part of the transmission signals S penetrates into the fill substance 1 and is reflected on reflectors located below the surface of the fill substance back to the fill-level measuring device. If is this the case, the above described method also enables identification of reference reflectors 15 of the invention located below the surface of the fill substance, along with measurement of their actual oscillation frequency $f_{\Delta Ref}$. In the case of sufficiently long measurement duration and therewith correspondingly more exact measuring of the actual oscillation frequency $f_{\Delta Ref}$, the fill-level measuring device can, based on corresponding reference values, determine whether the measured oscillation frequency $f_{\Delta Ref}$ corresponds to the oscillation frequency of the reference reflector 15 in the free state or in the state covered by fill substance 1. On the basis of this, the fill-level measuring device detects automatically whether, respectively, that, the fill level L lies above the installed height of this reference reflector 15. This supplemental information can be taken into consideration, for example, for the initially described identification of the wanted echo attributable to the reflection on the surface of the fill substance.

The invention claimed is:

1. A method for calibrating and/or monitoring a coherent frequency modulation, continuous wave radar, fill-level measuring device for measuring a fill level of a fill substance in a container, comprising the steps of:
sending toward the fill substance, with a predetermined repetition frequency, transmission signals linearly frequency modulated by means of a predetermined modulation, and receiving as received signals their fractions reflected on reflectors located in the beam path of the transmission signals back to the fill-level measuring device;

a reference reflector executing oscillations toward the fill-level measuring device with an oscillation frequency amounting to less than half the repetition frequency is inserted above the fill substance at a known distance from the fill level measuring devices in the beam path of the transmission signals;

for each received signal, an echo function, which is based on the received signals and their time correlation relative to the respectively associated transmission signal is recorded, which echo function shows the amplitudes of the received signal as a function of its frequency difference relative to an instantaneous transmission frequency of the transmission signal present at its receipt, a signal travel time associated with the frequency difference by way of the time dependence of the modulation or a distance to the respective reflector corresponding to the signal travel time;

based on the time change of a plurality of sequentially recorded echo functions and the oscillation frequency of the reference reflector, a frequency difference, signal travel time or distance to be assigned to the refernce reflector is identified and determined as associated reference reflector position; and the calibrating and/or monitoring of the fill-level measuring device occurs based on the reference reflector position and the known distance of the reference reflector from the fill-level measuring device.

2. The method as claimed in claim 1, wherein:

the oscillations of the reference reflector have an oscillation amplitude, which lies below a distance resolution of the fill-level measuring device;

the echo functions reflect complex valued amplitudes of the received signals and sequentially registered echo functions have a fixed phase relationship relative to one another;

the maxima of the echo functions are determined and their complex valued amplitudes together with their positions in the respective echo function are retained;

as for each maximum, based on the complex valued amplitude of a predetermined number of sequential echo functions at the position of the respective maximum, a movement spectrum is derived, which shows the complex valued amplitudes of the echo functions at the position of the respective maximum as a function of their alteration frequency;

the respective alteration frequency is the frequency of the periodically changing amplitude of respective maxima in the sequentially recorded echo function;

that movement spectrum is ascertained, whose real- and/or imaginary part has a maximum at an alteration frequency lying in the region of the oscillation frequency of the reference reflector; and the position in the echo functions associated with this movement spectrum is determined as reference reflector position.

3. The method as claimed in claim 1, wherein:

based on the time changes of the amplitudes of a plurality of sequentially recorded echo functions at the reference reflector position, the actual oscillation frequency of the reference reflector is determined.

4. The method as claimed in claim 1, wherein:

the reference reflector is a mechanically oscillatable structure of a fill level limit switch protruding into the container.

5. The method as claimed in claim 3, wherein:

the functioning of the reference reflector is monitored based on its oscillation frequency and its actual oscillation frequency determined by the fill-level measuring device.

6. The method as claimed in claim 1, wherein:

a plurality of reference reflectors oscillating toward the fill-level measuring device respectively with oscillation frequencies amounting to less than half the repetition frequency are provided at different distances from the fill-level measuring device;

the reference positions of the reference reflectors located over the fill substance are determined; and the calibrating and/or monitoring occurs based on at least one of these reference reflector positions.

7. The method as claimed in claim 6, wherein:

the reference reflectors have oscillation frequencies of comparable size, and the ascertained reference reflector positions are associated with the individual reference reflectors based on their different distances from the fill-level measuring device.

8. The method as claimed in claim 6, wherein:

the reference reflectors have oscillation frequencies of different size, and the ascertained reference reflector positions are associated with the individual reference reflectors based on their different oscillation frequencies and/or their different distances from the fill-level measuring device.

9. The method as claimed in claim 2, wherein:

width and amplitude of the maxima lying in the region of the oscillation frequency are determined and monitored for movement spectra of the reference reflector derived at different times.

* * * * *